(12) United States Patent
Sung

(10) Patent No.: US 6,905,099 B2
(45) Date of Patent: Jun. 14, 2005

(54) MONITOR (75) Inventor: Ki-hyub Sung, Suwon (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 10/623,886

(22) Filed: Jul. 22, 2003

(65) Prior Publication Data

US 2004/0113031 A1 Jun. 17, 2004

(30) Foreign Application Priority Data

Nov. 5, 2002 (KR) .................................. 10-2002-0068265

(51) Int. Cl.$^7$ ............................................. A47G 23/03
(52) U.S. Cl. ...................................................... 248/146
(58) Field of Search ................................ 248/161, 146, 248/407, 408, 409, 423, 917, 918, 919, 920

(56) References Cited

U.S. PATENT DOCUMENTS

| | | | | |
|---|---|---|---|---|
| 4,395,010 A | * | 7/1983 | Helgeland et al. | 248/371 |
| 4,616,218 A | * | 10/1986 | Bailey et al. | 361/682 |
| 4,690,362 A | * | 9/1987 | Helgeland | 248/404 |
| 4,986,173 A | * | 1/1991 | Hahnewald et al. | 99/338 |
| 6,517,040 B1 | * | 2/2003 | Wen | 248/278.1 |
| 2004/0026975 A1 | * | 2/2004 | Rausch et al. | 297/344.1 |
| 2004/0084585 A1 | * | 5/2004 | Watanabe et al. | 248/276.1 |

FOREIGN PATENT DOCUMENTS

| | | |
|---|---|---|
| EP | 0 965 786 | 12/1999 |
| JP | 11-184395 | 7/1999 |
| KR | 20-182808 | 3/2000 |
| KR | 20-215332 | 12/2000 |
| KR | 10-296283 | 5/2001 |
| KR | 20-261283 | 1/2002 |
| KR | 20-279427 | 6/2002 |
| KR | 20-281318 | 6/2002 |

* cited by examiner

Primary Examiner—Leslie A. Braun
Assistant Examiner—Kofi Schulterbrandt
(74) Attorney, Agent, or Firm—Staas & Halsey LLP (57) ABSTRACT A monitor having a monitor body, includes a base member supporting the monitor body, a stationary stand member standing on the base member, a movable stand member coupled to the stationary stand member so as to move up and down, and having a locker accommodating part, a locker provided in one of the stationary stand member and the base member, so as to be locked into or releasing from the locker accommodating part of the movable stand member. With this configuration, the present invention provides a monitor, wherein the volume is diminished when it is packed.

18 Claims, 9 Drawing Sheets

MONITOR

CROSS-REFERENCE TO RELATED APPLICATIONS

This application claims the benefit of Application No. 2002-68265, filed Nov. 5, 2002, in the Korean Intellectual Property Office, the disclosure of which is incorporated herein by reference.

BACKGROUND OF THE INVENTION

1. Field of the Invention

The present invention relates, in general, to a monitor, and more particularly, to a monitor, wherein the volume can be diminished when it is packed.

2. Description of the Related Art

Recently, the demand for monitors has rapidly increased, as personal computers have come into wide use. In order to cope with demands from a variety of the consumers, monitors employing a variety of functions have been provided to increase convenience in using them.

As an example, Korean Utility Model Registration No. 20-279427 discloses a monitor comprising a base, a stand standing on the base, a plate fixed on a bracket in the rear of the monitor and extended downward, a guide plate fixed on the stand and having a pair of rail grooves, a slider having a projection to be inserted into the rail grooves of the guide plate and moving up and down along the guide plate, a pusher fixed to the lower part of the slider, being formed with a semi-circular seating recess in the bottom thereof, and a spiral spring, one end of which is fixed to the stand and the other of which is positioned in the seating recess of the pusher elastically supporting the monitor in a direction opposite to the weight of the monitor.

In the conventional monitor with this configuration, the height of the monitor is adjusted based on the following. When a user would like to locate the monitor at his desired height by moving the monitor downward, the monitor is pressed downward, overcoming the elasticity or spring force of the spiral spring. If the external force applied to the monitor is removed when the monitor reaches the appropriate height, the weight of the monitor is balanced with the elasticity or force of the spiral spring, thereby allowing the movement of the monitor to be suspended at the height as desired by the user.

In the conventional monitor as described above, the monitor is able to be positioned at the appropriate height since the weight of the monitor is balanced with the elasticity of the spiral spring. In this regard, if the monitor body and the stand therefor are separated so as to pack the monitor, the weight of the monitor balanced with the elasticity or force of the spiral spring disappears, whereby a slider connected with the spiral spring moves upward according to the absence of the weight of the monitor.

Practically, the volume of packing is optimal when the slider moves downward, even through the monitor body is separated, allowing the monitor body to be located nearest the base. However, in the conventional monitor, if the monitor body is separated, the slider moves upward, thereby reaching the highest position as possible. Since the monitor has to be packed under this condition, the overall volume when the monitor is packed is increased.

SUMMARY OF THE INVENTION

Accordingly, it is an aspect of the present invention to provide a monitor wherein the volume when it is packed is diminished.

Additional aspects and advantages of the invention will be set forth in part in the description which follows and, in part, will be obvious from the description, or may be learned by practice of the invention.

The foregoing and/or other aspects of the present invention are achieved by providing a monitor having a monitor body, comprising a base member supporting the monitor body, a stationary stand member standing on the base member, a movable stand member coupled to the stationary stand member so as to move up and down, and having a locker accommodating part, a locker provided in one of the stationary stand member and the base member, so as to be locked into or released from the locker accommodating part of the movable stand member.

According to an aspect of the invention, a through hole is formed on a part of the base member. The locker is elastically coupled to the through hole so as to move between a locking position at which the locker is engaged with the locking part when the base member is separately positioned from a mounting face on which the base member is seated and a releasing position at which the locker is released from the locker accommodating part when the base member is located in contact with the mounting face so that the movement of the movable stand member is allowed.

According to an aspect of the invention, the locker comprises a contacting part exposed outside through the through hole, contacting the mounting face, a hook locked into and released from the locker accommodating part of the movable stand member, and a hinge part rotatably supporting the contacting part and the locker relative to the stationary stand member.

According to an aspect of the invention, the monitor further comprises a spring member having a first side coupled to the stationary stand member and a second side in contact with the locker, supplying the locker with an elasticity biasing the locker in the locked position.

According to an aspect of the invention, the monitor further comprises a spring member disposed between the locker and the base member, supplying the locker with an elasticity biasing the locker in the locked position.

According to an aspect of the invention, an extension space and a contraction space are formed in the base member which includes a through hole inclined at a predetermined angle. The locker includes a contacting part exposed outside through the through hole, being contacted with or separated from a mounting space on which the based member is seated, a hook locked into and released from the locker accommodating part of the movable stand member, and a supporting flange provided between the contacting part and the hook, covering the extension space formed by the through hole. A spring member is disposed between the extension space formed by the through hole and the supporting flange of the locker.

BRIEF DESCRIPTION OF THE DRAWINGS

The above and/or other aspects and advantages of the present invention will become more apparent by describing, in detail, preferred embodiments thereof with reference to the attached drawings in which.

DETAILED DESCRIPTION OF THE PREFERRED EMBODIMENTS

Reference will now be made in detail to the embodiments of the present invention, examples of which are illustrated in the accompanying drawings, wherein like reference numerals refer to like elements throughout. The embodiments are described below in order to explain the present invention by referring to the figures.

As shown in FIGS. 1, 2, 3, 4A, and 4B, a monitor 1 according to an embodiment of the present invention comprises a monitor body 3 on which pictures are displayed, a base-member 10 seated on a mounting surface 60 supporting the monitor body 3, a stationary stand member 20 standing on the base member 10, and a movable stand member 30 coupled to the stationary stand member 20 so as to be able to move the movable stand member up and down.

The stationary stand member 20 has an inner space, within which the movable stand member 30 is inserted and moves up and down, and a projection receiving part 22 in the front thereof, depressed from the plane thereof provided. A pair of spiral springs 24 are respectively in both inner spaces divided by the projection receiving part 22, supplying the movable stand member 30 with an elastic force supporting the monitor.

In the center of the projection receiving part 22 is formed an elongated hole 21 passing through the plane thereof so as to communicate with the inner space of the stationary stand member 20, guiding the movement of the movable stand member 30.

Each of the spiral springs 24 has a first side inserted into and supported by a supporting hole (not shown) formed on a side wall of the stationary stand member 20 and a second side in contact with the bottom of the movable stand member 30. Without the weight of the monitor to oppose the force of the springs 24, the initial condition is such that the movable stand member 30 reaches the highest elevation relative to the stationary stand member 20.

The elasticity or spring force of the spiral spring 24 provides an elevating force to the movable stand member 30, which is set correspondingly to the weight of the monitor body 3 so that the monitor body 3 can be maintained at the position that the user desires to locate the monitor body 3. When the user moves the monitor body 3 to the desired height, the movable stand member 30 moves up or down within the stationary stand member 20.

If the user moves the monitor body 3 to his desired position, the monitor body 3 can maintain its stationary status without further movement since the weight of the monitor body 3 is balanced with the elasticity of the spiral springs 24 at that position.

On the front lower face of the movable stand member 30 is formed a guide projection 31 projecting from the plane thereof and being inserted into the elongated hole 21 of the stationary stand member 20. Elevation of the movable stand member 30 is guided as the guide projection 31 of the movable stand member 30 inserted into the elongated hole 21 moves along the elongated hole 21.

In order to block the elevation of the movable stand member 30 due to removal of the weight of the monitor body 3 in the course of packing the monitor with the monitor body 3 separated from the movable stand member 30, the monitor 1 is provided with a locking device.

The locking device includes a locker accommodating part 32 on an inner face of the movable stand member 30 and a locker 40 mounted on the base member 10 so as to be locked into or released from the locker accommodating part 32.

On one end of the locker 40 is formed a hook 41 to be locked into and released from the locker accommodating part 32 of the movable stand member 30. On the other end of the locker 40 is provided a contacting part 42 being contacted with or separated from the mounting surface 60 on which the base member 10 is seated. The locker 40 is installed on the stationary stand member 20 by a hinge part 43 in a movable manner.

Figure 1:
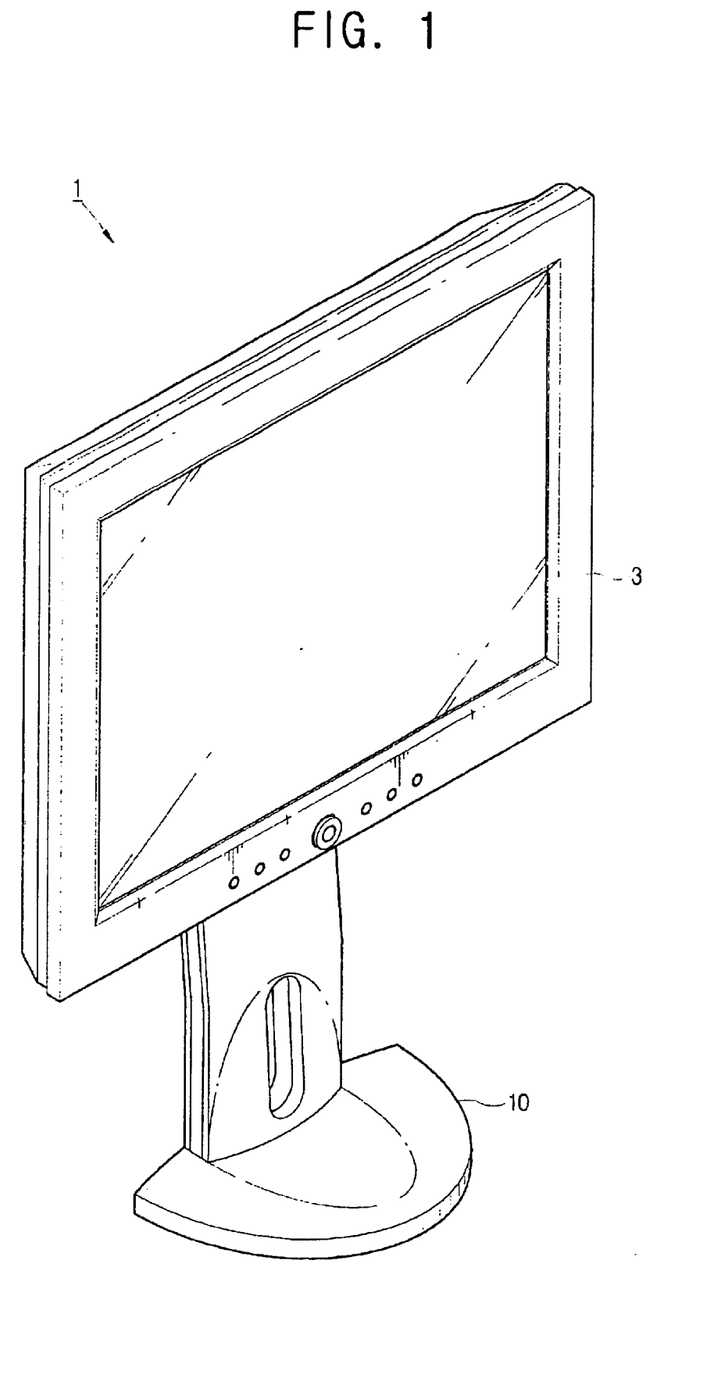
FIG. 1 is a perspective view of a monitor according to a first embodiment of the present invention.
Figure 2:
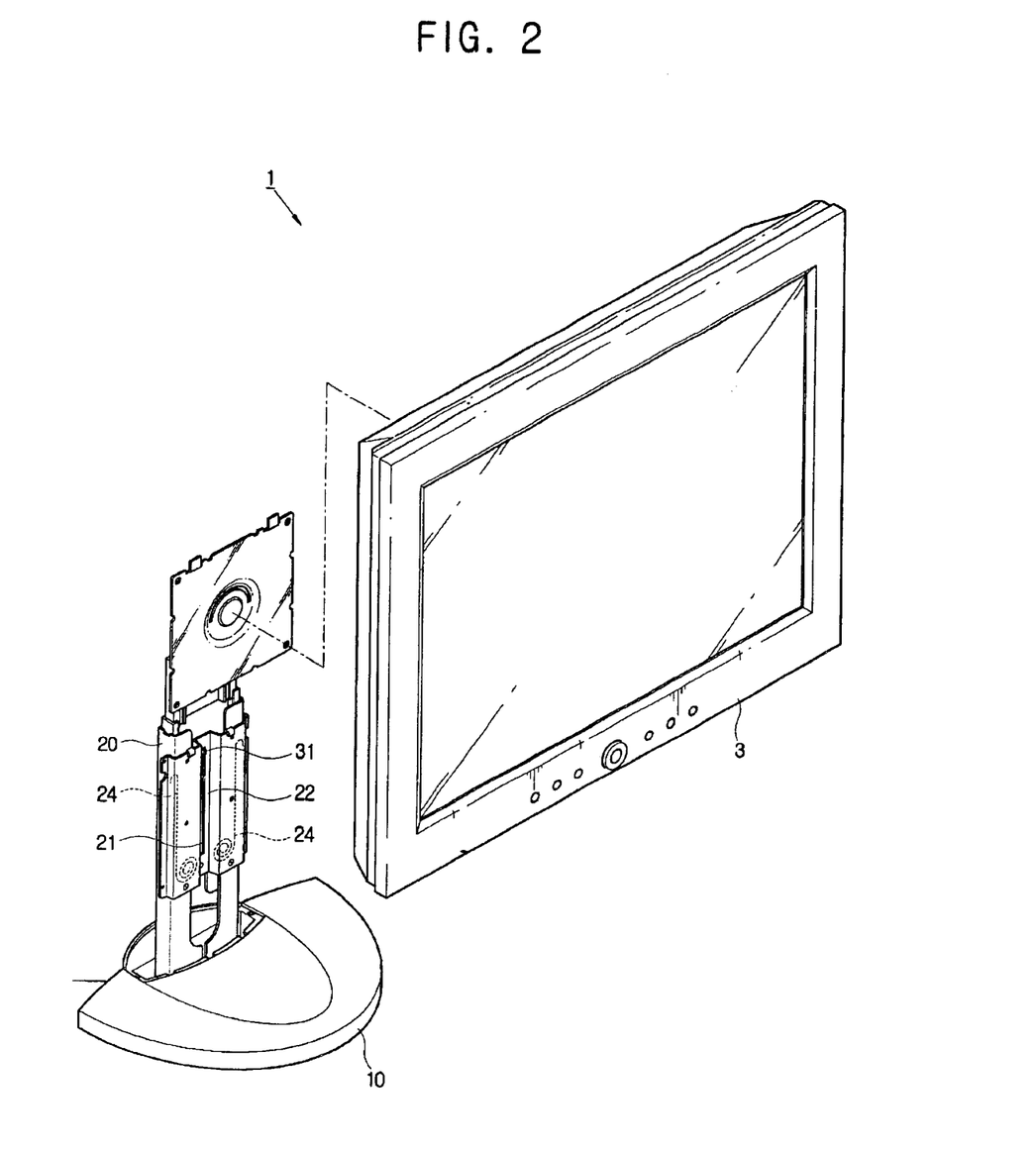
FIG. 2 is an exploded perspective view of the monitor shown in FIG. 1.
Figure 3:
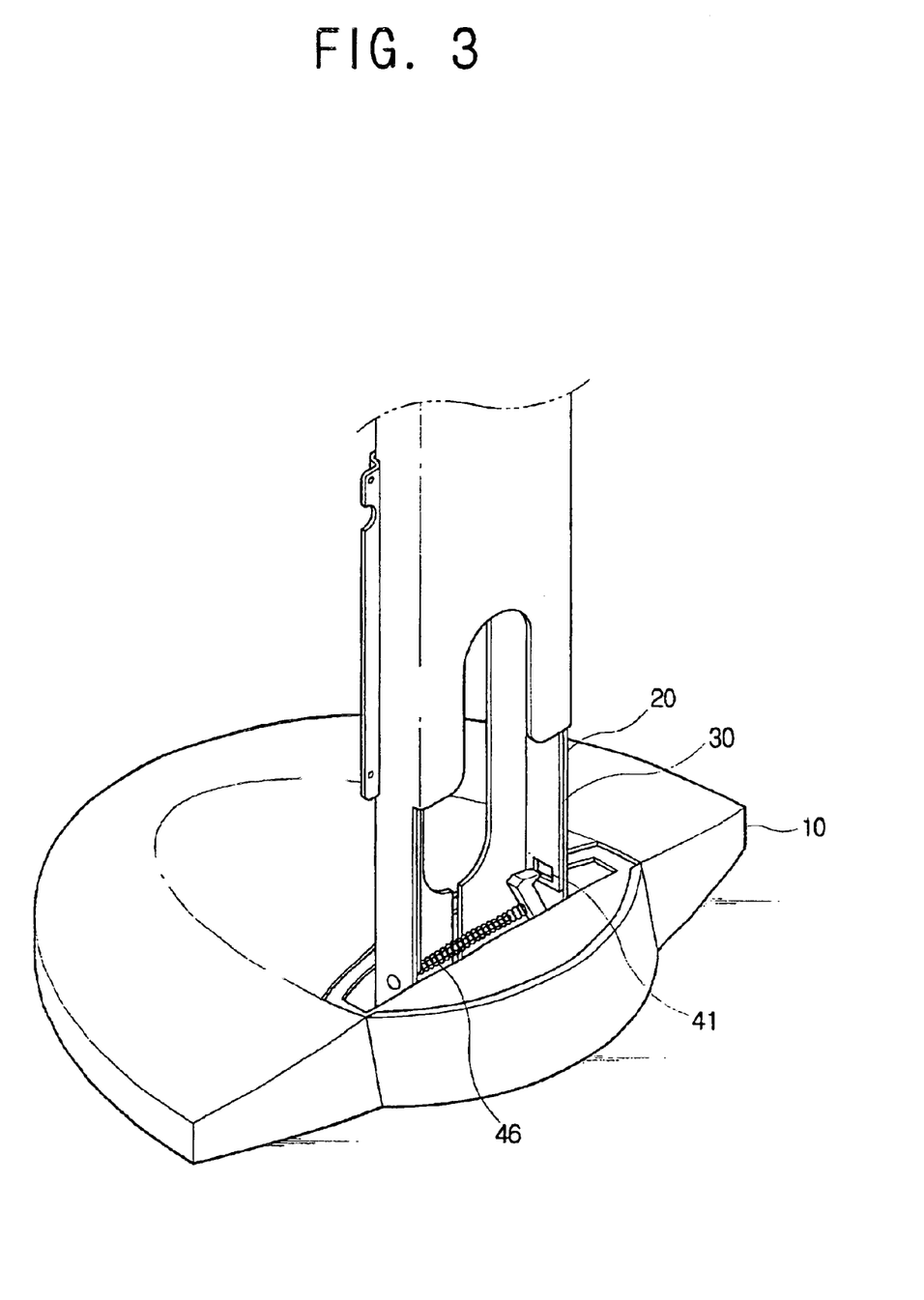
FIG. 3 is a schematic diagram of a locker-mounted region according to FIG. 2.
Figure 4A:
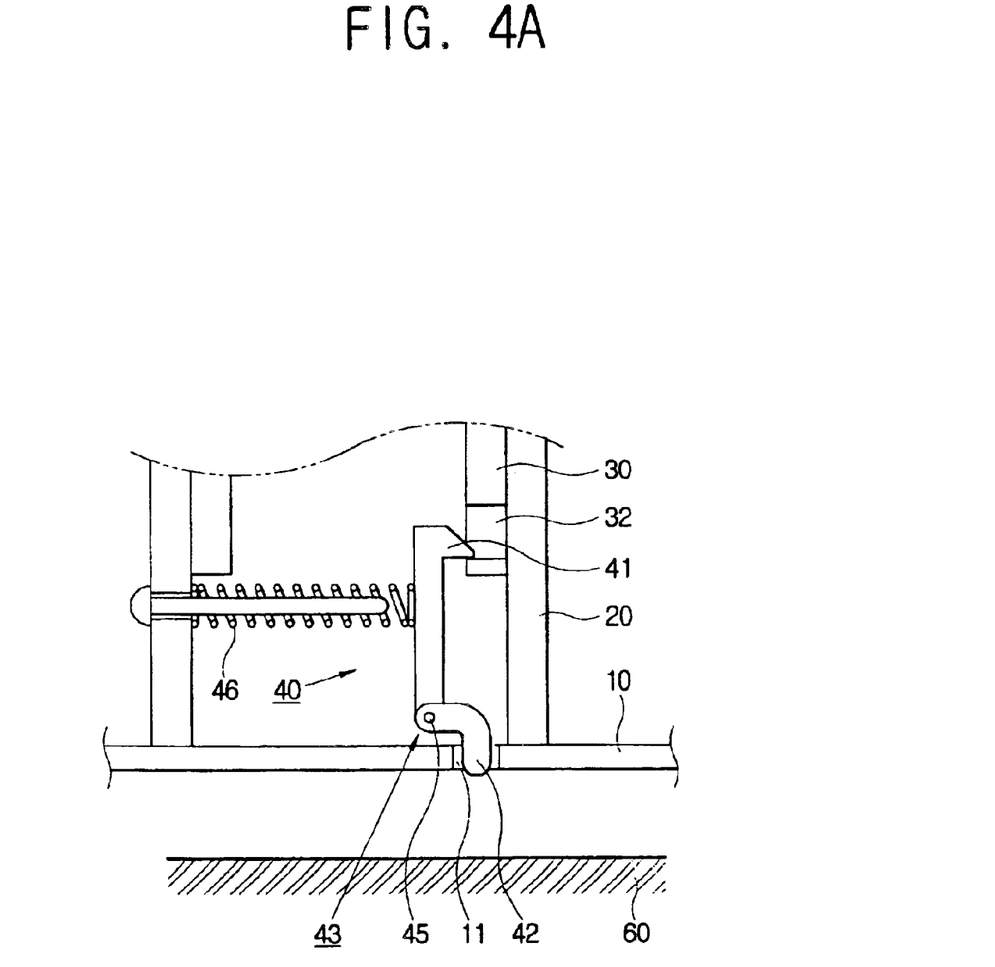
FIGS. 4A and 4B are views showing operations of the locker according to the first embodiment of the present invention.
Figure 4B:
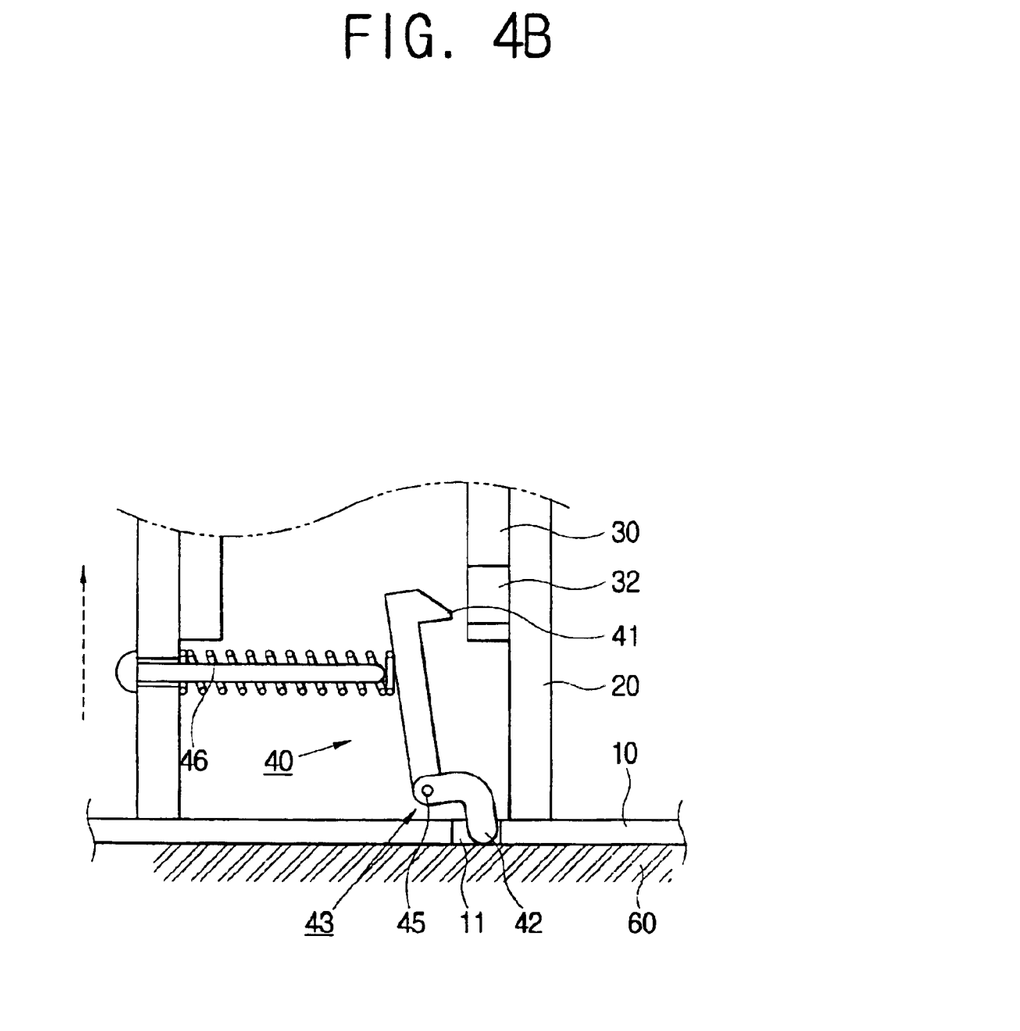

If the movable stand member 30 is moved down while the base member 10 is separately positioned from the mounting surface 60, the hook 41 is locked into the locker accommodating part 32 of the movable stand member 30. Thus, the locker 40 moves between a locking position at which the upward movement of the movable stand member 30 relative to the stationary stand member 30 is blocked and a releasing position at which the upward movement of the movable stand member 30 relative to the stationary stand member 30 is allowed because the base member 10 is contacted with the mounting surface 60.

The hinge part 43 includes a pin receiving hole (not shown) penetrating through the stationary stand member 20 and the locker 40 on the same axial line and a hinge pin 45 movably received in the pin receiving hole. That is, the locker 40 can rotate between the locking position and the releasing position by the hinge part 43.

A spring member 46 is installed between the stationary stand members 20, the spring member 46 supplying the locker 40 with the elasticity with which the locker 40 can elastically move from the releasing position to the locking position. When the base member 10 contacts the mounting surface 60, the spring member 46 is compressed by the locker 40 so that the hook 41 is at the releasing position of the locker 40. Then, if the base member 10 is removed from the mounting surface 60, the restoring force of the spring member 46 pushes against the hook 41, moving the hook 41 closer to the locker accommodating part 32. Thus, the hook 41 of the locker 40 is elastically moved to the locking position from the releasing position by the restoring force of the spring member 46 when the base 10 is removed from the mounting surface 60.

Operation of the locker 40 is described below when the monitor according to the present invention is disassembled.

When the user moves the monitor body 3 to locate the monitor body 3 at his desired position, the monitor body 3 maintains the user's desired position due to the balance of the elasticity of the spiral spring 24 providing force opposing the weight of the monitor body 3.

If the monitor body 3 is separated from the movable stand member 30 by the user while the monitor body 3 is in suspension, the balance between the elasticity of the spiral spring 24 and the weight of the monitor body is overcome, and thereby, the movable stand member is elevated upward.

Since the base member 10 is positioned in contact with the mounting surface 60, the contacting part 42 of the locker 40 stays inserted into the penetrating hole 11 as pushed by the mounting surface 60. Thus, the hook 41 of the locker 40 is located at the releasing position, and the spring member 46 contracts because of compression at the releasing position of the hook 41. Thus, when the hook 41 of the locker 40 is located at the releasing position, the hook 41 of the locker 40 does not interrupt the upward movement of the movable stand member 30.

Under this condition, if the user holds the stationary stand member 20 and separates the base member 10 from the mounting surface 60, the hook 41 of the locker 40 moves to the locking position, putting the hinge part 43 in the center, owing to the restoring force of the spring member 46, and the contacting part 42 of the locker 40 moves so as to be exposed to the outside of the base member 10 through the penetrating hole 11.

If the movable stand member 30 is moved downward toward the hook 41 of the locker 40, the locker accommodating part 32 of the movable stand member 30 engages with the hook 41 of the locker 40.

As described above, even though the monitor body 3 is separated from the movable stand member 30 to pack the monitor, the locker accommodating part 32 is engaged with the hook 41 at the lowest position of the movable stand member 30. Therefore, the present invention is capable of diminishing the volume when the monitor is packed, at a minimum, unlike the conventional monitor wherein the movable stand member 30 is located at the highest position when the monitor body 3 is separated.

Figure 5A:
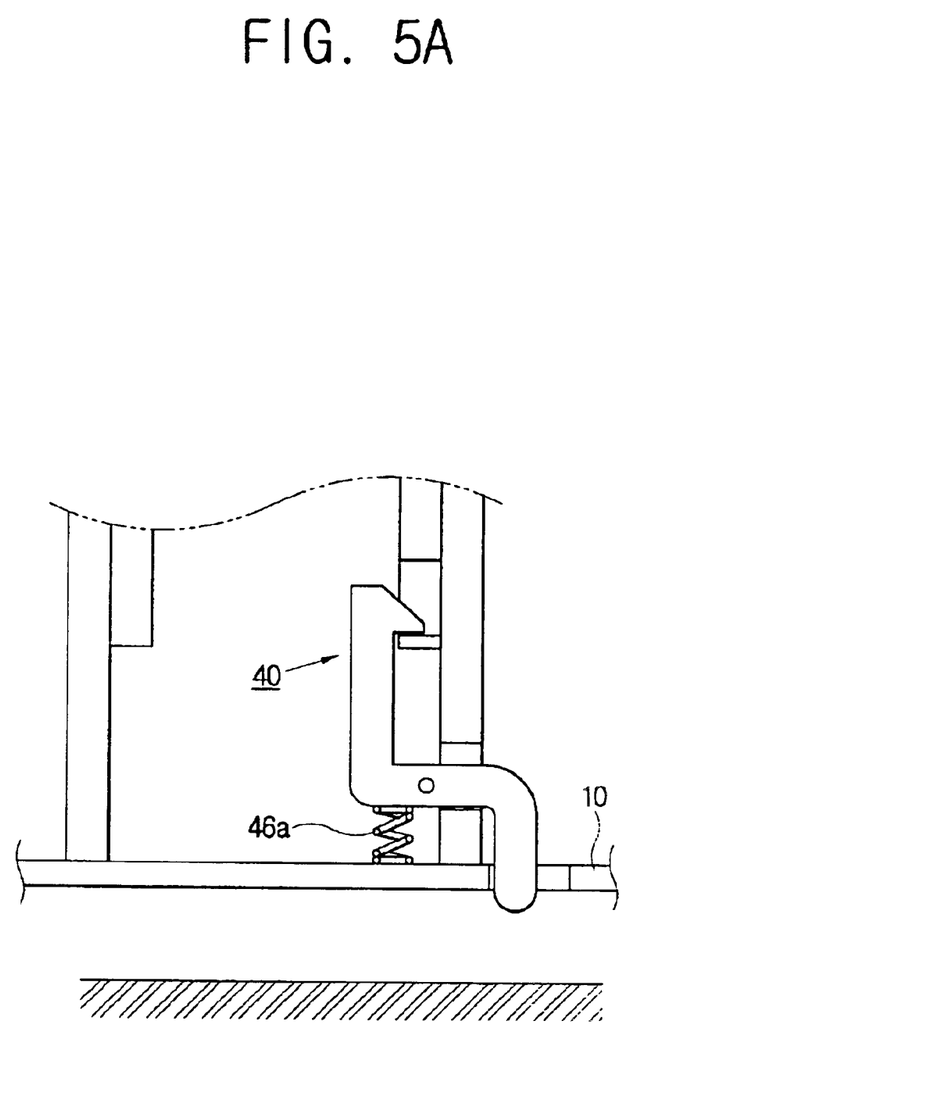
FIGS. 5A and 5B are views showing operations of the locker according to a second embodiment of the present invention.
Figure 5B:
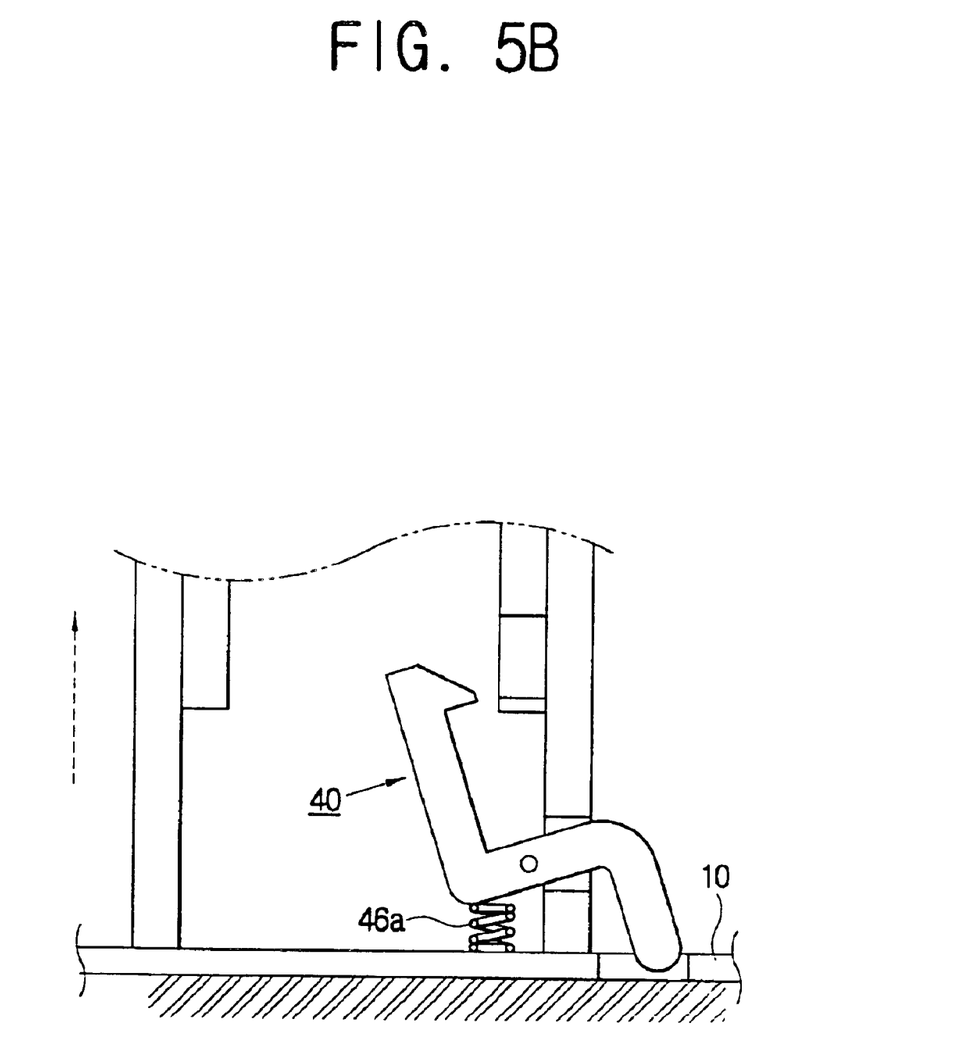

In the above-described first embodiment the spring member 46 is provided behind the hook 41 of the locker 40. In a second embodiment, as shown in FIGS. 5A and 5B, a spring member 46a mounted between the locker 40 and the base member 10.

Figure 6A:
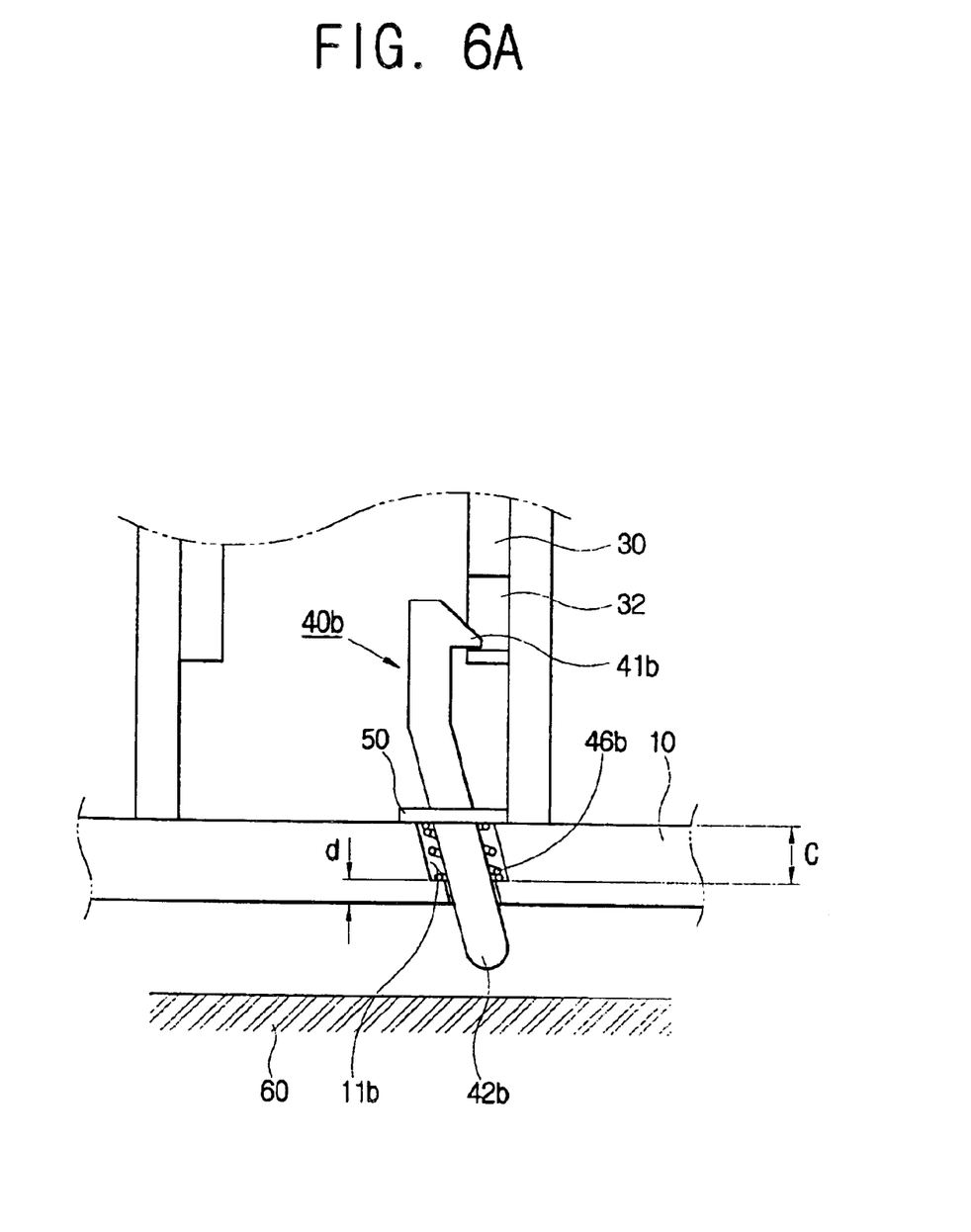
FIGS. 6A and 6B are views showing operations of the locker according to a third embodiment of the present invention.
Figure 6B:
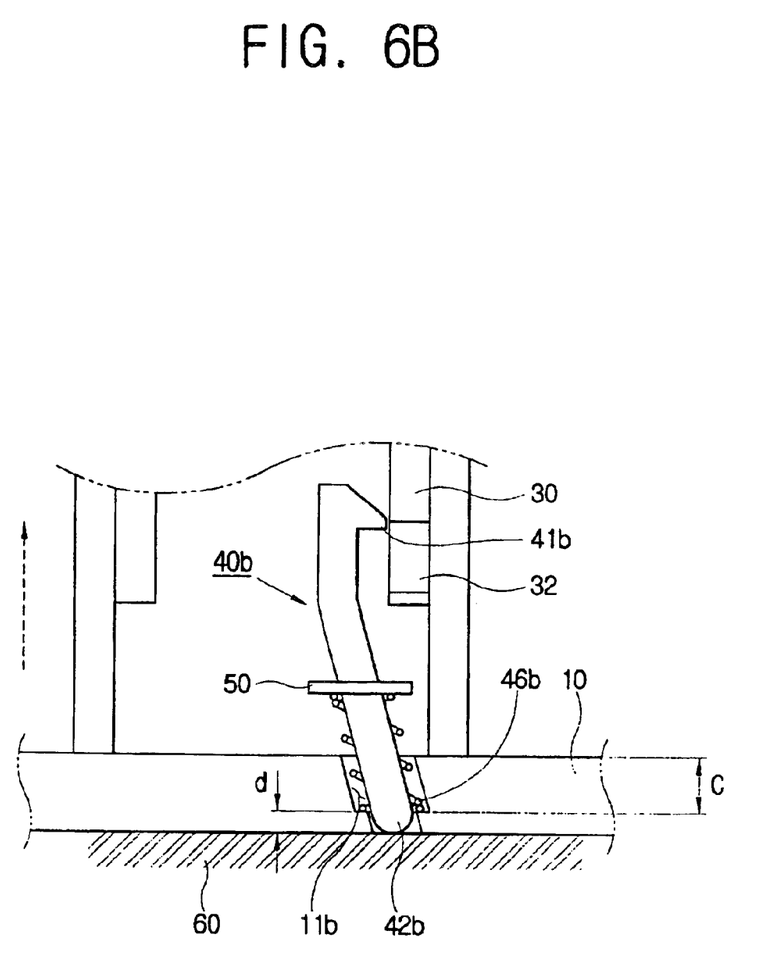

In the above-described first and second embodiments, the hinge part 43 is utilized. However, in a third embodiment as shown in FIGS. 6A and 6B, a locker 40b may be installed in a slant through hole 11b so that the locker 40b is slanted at a predetermined angle relative to the base member 10, in lieu of the hinge part 43.

In the third embodiment, the through hole 11b has an extension space "c" and a contraction space "d". Unlike the first and the second embodiments, the through hole 11b is slanted at the predetermined angle, a supporting flange 50 covering the extension space c of the through hole 11b is positioned on the locker 40b, and a spring member 46b is disposed between the extension space c of the through hole 11b and the supporting flange 50 of the locker 40b.

Accordingly, if the base member 10 is disposed to contact the mounting surface 60, contacting part 42b of the locker 40b is inserted into the through hole 11b as pushed by the mounting surface 60. At the same time, hook 41b moves upward by the distance that the contacting part 42b has been inserted into the through hole 11b. That is, the hook 41b is slanted at the predetermined angle relative to the base member 10, and this position serves as a releasing position of the locker 40b. The spring member 46b is elastically extended by the upward movement of the locker 40b.

If the base member 10b is separated from the mounting surface 60, the contacting part 42b is exposed outside through the through hole 11b owing to the restoring force of the spring member 46b. Simultaneously, the hook 41b of the locker 40b moves downward, reaching the locking position. After, the movable stand member 30 moves downward to the locking position, the hook 41b of the locker 40b is locked into the locker accommodating part 32 of the movable stand member 30, thereby blocking movement of the movable stand member 30.

The mounting surface 60 may be any relatively flat surface, such as, for example, a desk, floor, or personal computer cabinet.

As described above, according to the present invention, a monitor is provided, wherein the volume is diminished when it is packed.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A monitor having a monitor body configured to contact a mounting surface, comprising:
    a base member supporting the monitor body;
    a stationary stand member standing on the base member;
    a movable stand member movably coupled with the stationary stand member and having a locker accommodating part; and
    a locker provided in one of the stationary stand member and the base member, so as to be selectively locked into and released from the locker accommodating part of the movable stand member, the locker having a hook engageable with the locker accommodating part and elastically biased toward a locking position, and a contacting part elastically biased to protrude through the base member.

2. The monitor according to claim 1, wherein:
    a through hole is formed on a part of the base member; and
    the locker is elastically coupled with the through hole so as to move between a locking position at which the locker is engaged with the locker accommodating part when the base member is separately positioned from the mounting face on which the base member is seated and a releasing position at which the locker is released from the locker accommodating part when the base member is located in contact with the mounting face allowing movement of the movable stand member relative to the stationary stand member.

3. A monitor having a monitor body configured to contact a mounting surface, comprising:
    a base member supporting the monitor body;
    a stationary stand member standing on the base member;
    a movable stand member movably coupled with the stationary stand member and having a locker accommodating part; and
    a locker provided in one of the stationary stand member and the base member, so as to be locked into or released from the locker accommodating part of the movable stand member,
    wherein a through hole is formed on a part of the base member;
    the locker is elastically coupled with the through hole so as to move between a locking position at which the locker is engaged with the locker accommodating part when the base member is separately positioned from the mounting face on which the base member is seated and a releasing position at which the locker is released from the locker accommodating part when the base member is located in contact with the mounting face allowing movement of the movable stand member relative to the stationary stand member, and the locker comprises:

a contacting part exposed outside through the through hole, contactable with the mounting face, a hook locked into and released from the locker accommodating part of the movable stand member, and a hinge part rotatably supporting the contacting part and the locker relative to the stationary stand member.

4. The monitor according to claim 3, further comprising a spring member having a first side coupled with the stationary stand member and a second side elastically contacting the locker.

5. The monitor according to claim 3, further comprising a spring member elastically disposed between the locker and the base member.

6. The monitor according to claim 1, wherein:

an extension space and a contraction space are formed in the base member;

the base member includes a through hole inclined at a predetermined angle; and the locker includes:

the contacting part exposed outside through the through hole, being contacted with or separated from the mounting surface, on which the base member is seated;

a hook locked into and released from the locker accommodating part of the movable stand member;

a supporting flange provided between the contacting part and the hook, covering the extension space formed by the through hole; and a spring member disposed between the extension space formed by the through hole and the supporting flange of the locker.

7. A monitor stand supportable on a mounting surface, comprising:

a base member configured to contact the mounting surface;

a stationary stand member coupled with the base member;

a movable stand member movably coupled with the stationary stand member, the movable stand member being latchable in a fixed position relative to the stationary stand member only when the base member is removed from the mounting surface; and a locker hingedly attached to the stationary stand member, the locker having a hook elastically biased to contact the movable stand member and a contacting part elastically biased to protrude through the base member.

8. The monitor stand of claim 7, wherein contact by the contacting part with the mounting surface pushes the contact portion into the base member and pushes the hook away from the movable stand member.

9. The monitor stand of claim 7, wherein contact by the contacting part with the mounting surface rotates the hook away from the movable stand member thereby unlatching the movable stand member from the stationary stand member.

10. The monitor stand of claim 7, wherein the mounting surface comprises a vertical plane.

11. The monitor stand of claim 7, wherein the mounting surface comprises a horizontal plane.

12. The monitor stand of claim 7, wherein the hook is insertable into a slot in the movable stand member fixing the movable stand member to the stationary stand member when the base member is removed from the mounting surface.

13. The monitor stand of claim 7, wherein the movable stand member includes an inner face having a locker accommodating part engageable with the locker.

14. The monitor stand of claim 13, further comprising:

a hinge part having a pin receiving hole; and a hinge pin movably received in the pin receiving hole;

wherein the stationary stand member includes the pin receiving hole movably receiving the hinge pin to rotateably attach the locker to the stationary stand member between a locking position and a releasing position.

15. The monitor stand of claim 13, wherein the locker engages with the locker accommodating part only at a lowest position of the movable stand member relative to the stationary stand member.

16. The monitor stand of claim 7, further comprising:

a locker having a hook, the locker movably disposed in a slanted through hole in the base member;

wherein contact between the base member and the mounting surface moves the hook angularly away from the movable stand member thereby releasing the movable stand member from the stationary stand member.

17. The monitor stand of claim 16, further comprising:

a flange covering the top of the slant through hole;

a spring disposed in the slant through hole and elastically biasing the locker in the latched position.

18. A method of packing a monitor stand having a base, a stationary stand member fixed to the base, and a movable stand member slideabley coupled to the stationary stand member, the method comprising:

disengaging a contacting part of a locker from a mounting surface so that the locker moves to a locking position, the locker being provided in one of the base or the stationary stand member and elastically biased towards the locking position, the contacting part extending through the base; and sliding the movable stand member toward the base until the locker engages and locks the movable stand member relative to the stationary stand member.

* * * * *

UNITED STATES PATENT AND TRADEMARK OFFICE
CERTIFICATE OF CORRECTION

PATENT NO. : 6,905,099 B2
DATED : June 14, 2005
INVENTOR(S) : Ki-hyub Sung

It is certified that error appears in the above-identified patent and that said Letters Patent is hereby corrected as shown below:

Column 6,
Line 59, after "member" change ";" to -- , --.

Column 7,
Line 3, change "comprises:" to -- comprises --.

Column 8,
Line 25, change "rotateably" to -- rotatably --.
Line 46, change "slideabley" to -- slideably --.

Signed and Sealed this

Twenty-eighth Day of March, 2006

JON W. DUDAS
*Director of the United States Patent and Trademark Office*